United States Patent

Russell

[15] 3,649,094

[45] Mar. 14, 1972

[54] ANTIFRICTION BEARING AND CAGE

[72] Inventor: Elmore J. Russell, New Hartford, Conn.

[73] Assignee: The Torrington Company, Torrington, Conn.

[22] Filed: Dec. 22, 1969

[21] Appl. No.: 887,036

[52] U.S. Cl. ...........................................308/201
[51] Int. Cl. .........................................F16c 33/38
[58] Field of Search ..........................308/201, 217

[56] References Cited

UNITED STATES PATENTS

| 2,969,266 | 1/1961 | Schaeffer | 308/217 |
| 3,075,278 | 1/1963 | Bratt | 308/217 |
| 3,113,812 | 12/1963 | Dotter | 308/201 |
| 1,134,463 | 4/1965 | Knipe | 308/201 |
| 3,397,019 | 8/1968 | Day et al | 308/201 |
| 3,506,316 | 4/1970 | McKee | 308/201 |
| 3,510,185 | 5/1970 | McKee | 308/201 |

FOREIGN PATENTS OR APPLICATIONS

| 1,104,870 | 6/1955 | France | 308/201 |

Primary Examiner—Martin P. Schwadron
Assistant Examiner—Frank Susko
Attorney—Carl R. Horten, David W. Tibbott and Frank S. Troidl

[57] ABSTRACT

A bearing cage is provided for use with rolling members, an inner race, and an outer race. The cage is flexible both radially and circumferentially. Restraining means such as projections on the flexible cage or an annular member on the cage are provided to prevent axial movement of the cage with respect to the race when the cage is snapped into place on the race.

12 Claims, 12 Drawing Figures

Patented March 14, 1972
3,649,094
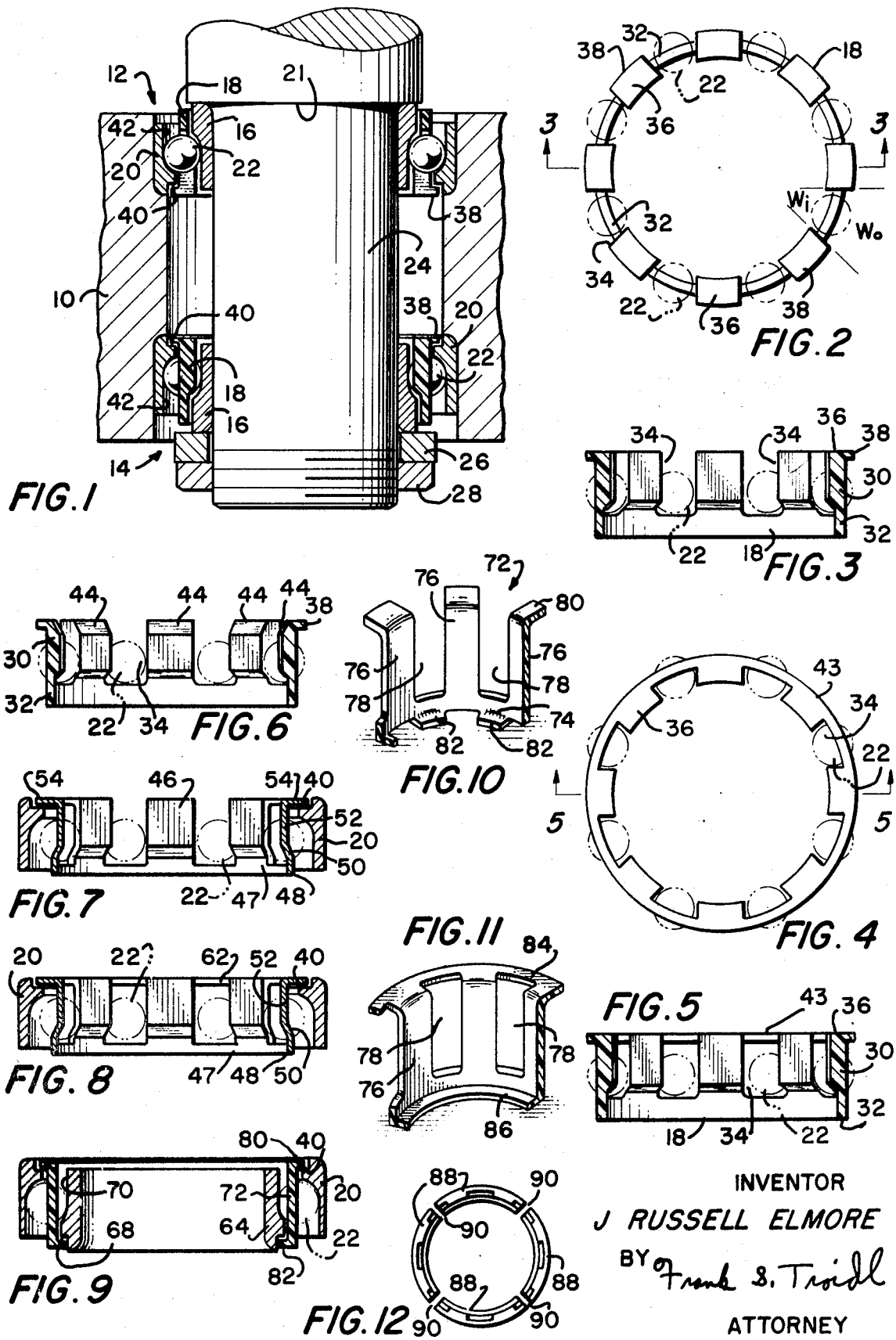
INVENTOR
J RUSSELL ELMORE
BY Frank S. Troidl
ATTORNEY 3,649,094

ANTIFRICTION BEARING AND CAGE

This invention relates to antifriction bearings. More particularly, this invention is an improved bearing cage and an improved bearing structure used in combination with the new cage.

In assembling a bearing with a separable inner race into a bearing housing, it is conventional to assemble the cage containing the rolling members into the outer race, place the assembly of cage, rolling members, and outer race into the bearing housing, and then thrust a shaft axially into the housing and through the assembled bearing. The inner race is then placed on the shaft and locked into place on the shaft.

With currently used assemblies, it often occurs that, when the shaft is thrust into the housing, the shaft pushes against the cage and the cage with its rolling members is pushed out of the outer race and the rolling members may fall or be knocked out of the cage. When this occurs, the cage, rolling members, and outer race must be reassembled and again inserted into the housing, and the shaft reinserted with the hope the cage will not be pushed out again. The disadvantage of the currently utilized assembly is obvious.

My invention provides the bearing art with a new cage and bearing assembly which can be inserted into the housing and the shaft thrust into the housing and through the bearing assembly with no fear of accidentally pushing the cage and the contained rolling members out of the housing.

Briefly described, the cage of my invention comprises a flexible member having a plurality of equally spaced pockets. A rolling member is placed in each pocket. Restraining means such as radially extending projections or a radially extending annular member are provided on the flexible member. The restraining means is adapted to securely engage a race when the cage is placed in the race. With this structure the cage may be snapped into place on the race with the restraining means securely engaging the race to prevent axial movement of the cage with respect to the race.

My invention also comprises a novel structure of outer race or a novel structure of inner race or both for use with my new cage.

The invention, as well as its many advantages, may be further understood by reference to the following detailed description and drawings in which:

FIG. 1 is an elevational view, partly in section, showing my new invention located in a housing with a shaft locked in place within the housing;

FIG. 2 is a plan view of the cage shown in FIG. 1;

FIG. 3 is a view taken along the lines 3—3 of FIG. 2;

FIG. 4 is a plan view of a modified form of cage;

FIG. 5 is a view taken along the lines 5—5 of FIG. 4;

FIG. 6 is an elevational view, partly in section, showing a further modification of my new cage structure;

FIG. 7 is an elevational view, partly in section, showing still another modification of my new cage structure assembled in an outer race;

FIG. 8 is an elevational view, partly in section, showing still another modification of my new cage structure located within an outer race;

FIG. 9 is an elevational view, partly in section, showing a modified cage structure located within an inner race and an outer race;

FIG. 10 is a fragmentary perspective view on an enlarged scale showing the cage of FIG. 9;

FIG. 11 is a fragmentary perspective view on an enlarged scale showing a modified cage which may be used with the inner race and the outer race of FIG. 9; and FIG. 12 is a plan view of another modified cage which may be used with the inner race and the outer race of FIG. 9.

Like parts throughout the various views are referred to by like numbers.

Referring to the drawing and more particularly to FIG. 1, a housing 10 is shown in which are located an upper antifriction bearing indicated generally by number 12 and a lower antifriction bearing indicated generally by number 14. Each antifriction bearing structure includes an inner race 16, a flexible cage 18, and an outer race 20. A plurality of rolling members such as balls 22 are located within the cage 18. Sometimes the shaft is used as the inner race.

The conventional practice is to first assemble the balls 22 into equally spaced pockets provided in cage 18. Cage 18 is then placed within outer race 20 and the assembled cage, balls, and outer race placed within housing 10. The upper inner race is installed on the shaft against the shoulder 21. The shaft 24 may then be thrust into housing 10 from above (looking at FIG. 1). After shaft 24 has been properly placed, the lower inner race is placed on the shaft, the washer 26 placed on the shaft and against the lower portion of the lower inner race, and the lock nut 28 threaded on the end of the shaft to securely lock the assembly in place.

FIGS. 2 and 3 show the cage structure in more detail. Referring to these figures, it is seen that cage 18 comprises a plurality of flexible bars 30. These bars extend upwardly from a flexible annular member 32. Bars 30 are equally spaced circumferentially on annular member 32, thus forming pockets 34 for receiving balls 22. Bars 30 are spaced apart a distance sufficient to provide pockets 34 which have an outside width $w_o$ greater than the diameter of balls 22. Each bar 30 has a portion 36 which extends inwardly toward the axis of the cage. The bars are constructed so that portion 36 extends toward the axis of the cage a sufficient distance to reduce the inside width $w_i$ to less than the diameter of ball 22.

Annular member 32 can be flexed radially and also can be flexed axially. Bars 30 can be flexed radially and circumferentially. Therefore, balls 22 can be pushed into pockets 34 from the inside of the cage. Once balls 22 are placed in pockets 34, they will be prevented from falling inwardly because the width $w_i$ is less than the diameter of the balls. The balls are prevented from falling downwardly by annular member 32.

The cage includes projections or lugs 38 which extend radially outwardly from the end of each of the bars 30. Projections 38 are integral with bars 30 and are also made of flexible material.

Referring again to FIG. 1, outer race 20 is provided with a counterbore in one end thereof, thereby forming a shoulder 40 axially spaced from its raceway 42. Therefore, cage 18 with its balls 22 can be snapped into place in the outer race 20 and the thus assembled bearing inserted into housing 10. The projections 38 complement shoulder 40, and the cage cannot be accidentally pushed out of the housing when shaft 24 is inserted.

In the embodiment of FIGS. 4 and 5, an annular member 43 is integrally connected to the ends of bars 30 and extends radially outwardly. Annular member 43 is also radially and axially flexible; and when the cage is snapped into outer race 20 of FIG. 1, annular member 43 complements race 20 of FIG. 1, annular member 43 complements shoulder 40.

The embodiment of FIG. 6 is provided with a chamfer 44 on each of the flexible bars 30. The provision of chamfer 44 permits easier insertion of the shaft into the assembly. It is to be understood that, if desired, any of the other embodiments could be provided with a chamfer.

The cage may be made of either plastic as shown in FIGS. 1 through 6 or metal. The embodiment of FIG. 7 shows a cage structure made of thin metal. A plurality of spring bars 46 are circumferentially equally spaced on annular member 47. Each bar 46 includes a portion 48 extending perpendicularly from annular member 47, an inclined portion 50 extending upwardly and inwardly from portion 48, a second vertical portion 52 extending upwardly from portion 50, and a restraining portion 54 perpendicular to portion 52 and extending radially outwardly. The entire cage structure is flexible radially, and the outer ends of the bars are movable circumferentially. Restraining portion 54 snaps securely on shoulder 40 of outer race 20.

In the embodiment of FIG. 8, a radially and axially flexible annular member 62 is connected to all of the bars 46 and extends radially outwardly therefrom. Annular member 62 serves a function similar to the function of portion 54 of FIG. 7.

Some manufacturers prefer to insert into the housing an antifriction bearing assembly which includes the inner race as well as the cage, balls, and outer race. In this case, the two-race assembly is inserted into the housing and then the shaft is installed, as distinguished from the insertion of the cage-outer race assembly, followed by the shaft and then the inner race. The embodiment of FIG. 9 provides such an assembly. Inner race 64 is provided with a counterbore resulting in an inner race shoulder 68 axially spaced from its raceway 70. The cage 72 holds the entire assembly together.

As shown more clearly in FIG. 10, cage 72 includes an annular member 74 with circumferentially equally spaced bars 76 extending upwardly and perpendicularly from annular member 74. Bars 76 do not extend axially inwardly from annular member 74. Therefore, the inside width and the outside width of each pocket 78 are approximately the same. The width of pockets 78 is slightly more than the diameter of the balls placed in the pockets. Therefore, bars 76 perform the function of separating the balls and do not perform the additional function of preventing the balls from falling inwardly. However, if desired, bars 76 could be constructed with inwardly extending portions to retain the balls as in FIGS. 3 and 7.

Restraining radially outwardly extending lugs 80 are provided on the end of each bar 76. Inwardly extending lugs 82 are provided on the lower end of annular member 74. The entire cage 72, including annular member 74, bars 76, lugs 80, and lugs 82, is made of radially and axially flexible material.

The embodiment of FIGS. 9 and 10 is assembled by first placing the balls in pockets 78, then snapping cage 72 in outer race 20. Lugs 80 which securely engage shoulder 40 on outer race 20 prevent axial movement of the cage and balls downwardly looking at FIG. 9. Inner race 64 is then snapped into place. Lugs 82 securely engage inner race shoulder 68, thus preventing axial movement of the cage and bar assembly upwardly looking at FIG. 9. An alternate assembly method is to first assemble the inner race and cage, then place the balls in the pockets, and then push this assembly upward into the outer race until lugs 80 snap into place above shoulder 40.

In the embodiment of FIG. 11, an annular ring 84 is substituted for lugs 80 of FIG. 10 and an annular ring 86 is substituted for lugs 82 of FIG. 10. If desired, instead of using all lugs as restraining members or the two annular rings as restraining members, one annular ring and one set of lugs could be used.

Instead of a full annular ring 84, the annular ring may be discontinuous in two or more sections either equal or unequal in circumferential length. This embodiment is shown in FIG. 12 and includes a plurality of sections 88 separated by slits 90. If desired, the lower annular ring may also be discontinuous in two or more sections either equal or unequal in circumferential length.

I claim:

1. In a bearing having ball members, an inner race, and an outer race, a cage comprising a radially flexible annular portion, a plurality of flexible bars integral with the radially flexible annular portion, each bar extending axially from the annular portion with parallel inwardly directed faces toward the inner race, each of the bars being equally spaced circumferentially on the annular portion thereby forming pockets for the ball members, and restraining means integral with the bars and extending perpendicularly from adjacent the other end of at least one of the bars engaging at least one of the races at a location other than the raceway, whereby the cage may be snapped into place on at least one of said races with the restraining means securely engaging at least one of said races to prevent axial movement of the cage with respect to at least one of said races.

2. A cage in accordance with claim 1 wherein the restraining means extends radially outwardly from adjacent the end of the bars and engages the outer race.

3. A cage in accordance with claim 2 wherein the restraining means comprises a projection on each bar.

4. A cage in accordance with claim 2 wherein the restraining means comprises a radially flexible annular member.

5. A cage in accordance with claim 2 wherein the restraining means comprises a discontinuous annular member formed of a plurality of sections.

6. The combination of ball rolling members, an outer race provided with a rolling member raceway and a shoulder axially spaced from said raceway, and a cylindrical flexible member having a plurality of equally spaced pockets parallel to the cylindrical axis and restraining means on the flexible member engaging said outer race shoulder when the flexible member is snapped into place in the outer race preventing axial movement of the flexible member with respect to the outer race, the flexible member further comprising a radially flexible annular portion, a plurality of radially flexible bars integral with the radially flexible annular portion and having parallel inwardly directed faces, the bars being equally spaced circumferentially on the annular portion thereby forming pockets, and the restraining means being a radially flexible annular member.

7. The combination of claim 6 in which the bars are spaced apart a distance sufficient to provide a pocket having an outside width greater than the width of the rolling member, said bars having at least a portion located inwardly toward the axis of the annular portion a sufficient distance to reduce the width of the pocket to less than the width of the rolling members whereby the rolling members may be snapped into the pockets through the lower width portion, the cage snapped into place in the outer race, and the cage and outer race with the retained rolling members handled as a unit without losing the rolling members.

8. The combination of a cage comprising a radially flexible annular portion, a plurality of radially and circumferentially flexible bars integral with the radially flexible annular portion and extending from the annular portion with parallel inwardly directed faces, the bars being axially parallel and equally spaced circumferentially on the annular portion to thereby form pockets for receiving ball rolling members, a first restraining means extending radially outwardly from adjacent the end of the bars, a second restraining means extending radially inwardly from the flexible annular portion, an outer race having a ball rolling member raceway extending from one end and a counterbore extending from the other end to provide an outer race shoulder adapted to securely engage the first restraining means on the cage, and an inner race having a ball rolling member raceway extending from one end and a counterbore extending from the other end to provide an inner race shoulder adapted to securely engage the second restraining means on the cage.

9. The combination of claim 8 wherein one of the restraining means comprises projections and the other of the restraining means comprises a radially flexible annular member.

10. The combination of claim 8 wherein both of the restraining means are projections.

11. The combination of claim 8 wherein both of the restraining means are radially flexible annular members.

12. The combination of claim 8 wherein at least one of said first and second restraining means comprises a discontinuous annular member formed of a plurality of sections.

* * * * *

UNITED STATES PATENT OFFICE
CERTIFICATE OF CORRECTION

Patent No. 3,649,094    Dated March 14, 1972

Inventor(s) J. Russell Elmore

It is certified that error appears in the above-identified patent and that said Letters Patent are hereby corrected as shown below:

On the cover sheet, [72] "Elmore J. Russell" should read -- J Russell Elmore -- .

Signed and sealed this 14th day of November 1972.

(SEAL)
Attest:

EDWARD M. FLETCHER, JR.
Attesting Officer

ROBERT GOTTSCHALK
Commissioner of Patents